United States Patent
Alzmann

[11] 3,709,591
[45] Jan. 9, 1973

[54] VARIABLE PHOTOGRAPHIC MASK FOR MAINTAINING MULTIPLE CONSTANT PROPORTIONS OF A VISIBLE AREA

[76] Inventor: Walter Alzmann, 7850 Rudnick Avenue, Canoga Park, Calif. 91304

[22] Filed: July 26, 1971

[21] Appl. No.: 165,898

[52] U.S. Cl.....................................355/126, 355/74
[51] Int. Cl.............................................G03b 27/28
[58] Field of Search...............................355/74, 126

[56] References Cited

UNITED STATES PATENTS

| | | | |
|---|---|---|---|
| 2,246,920 | 6/1941 | Kromholz | 355/126 |
| 2,702,944 | 1/1955 | Lane | 355/74 |
| 3,203,334 | 8/1965 | Wilson | 355/126 |

*Primary Examiner*—John M. Horan
*Attorney*—Frank E. Wattles

[57] ABSTRACT

A mask for demarcating a selected portion of a photograph according to constant proportions of an aperture of the mask for use in making reproductions or projections, usually enlargements, of the selected portion. The mask includes a sheath which guides a slide through two opposite open ends of the sheath. A substantially rectangular aperture passes through the sheath and slide. Two diagonally opposite corners of the aperture are located on coincident centerlines of the sheath and slide and two aperture sides forming one of the corners are of a different proportion then the opposing two aperture sides forming the other corner. The slide aperture so formed is rotated 180° within the sheath to locate identically proportioned sides of the sheath and slide opposite each other on the coincident centerlines. In operation, the aperture is placed over the selected portion of a photograph and the particular proportion of the selected area is chosen by adjusting the area of the aperture by adjusting the position of the slide. The desired size is marked on the photograph by outlining the aperture. If the other proportion is desired instead, then the slide is adjusted in the opposite direction to adjust the area of the aperture.

2 Claims, 1 Drawing Figure

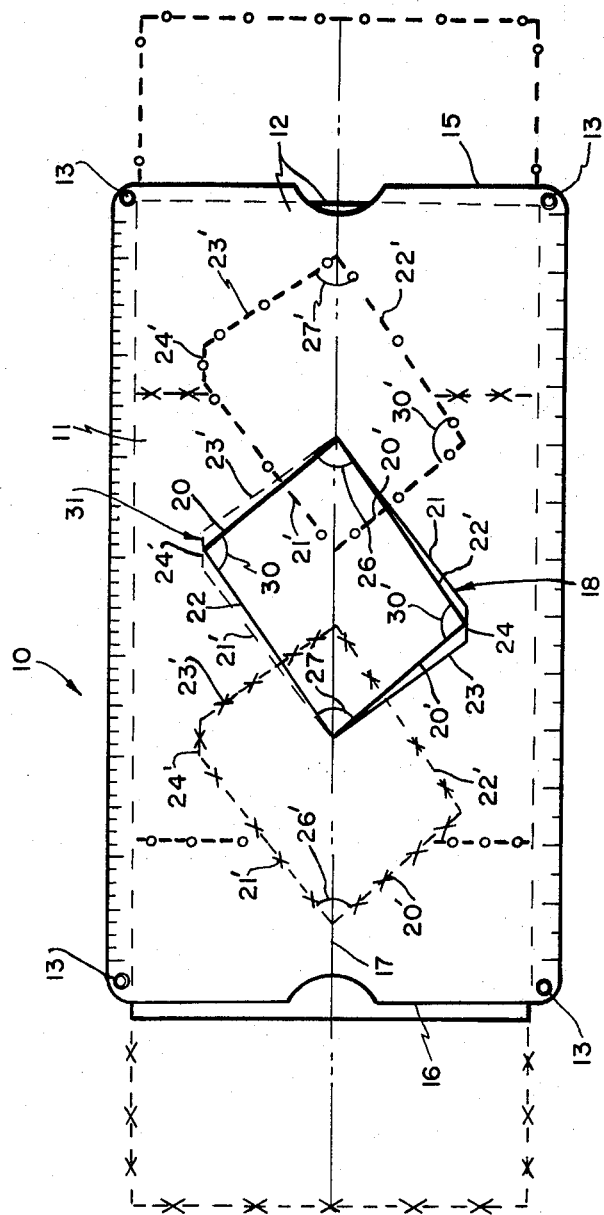

VARIABLE PHOTOGRAPHIC MASK FOR MAINTAINING MULTIPLE CONSTANT PROPORTIONS OF A VISIBLE AREA

BACKGROUND OF THE INVENTION

1. Field of the Invention

A variable photographic mask and more particularly such a mask having an aperture for multiple constant proportions of the selected portion of a photograph or the like.

2. Description of the Prior Art

Frequently it is desired to select only a portion of a print or negative and to reproduce the selected portion by enlargement. This selection process is referred to as cropping. The enlargements are usually of certain standard dimensions, such as a size and proportion of 8 by 10 inches. To produce an enlargement of a certain size and proportion it is necessary that the smaller selected area be of the same proportions of height to width.

It is well-known to crop a photograph by employing two L-shaped plates to form a substantially rectangular mask. The two plates are placed upon the print or the like and shifted in relative position until the desired size and shape is obtained. The print is outlined along the inner edge of the positioned mask. The accuracy of this technique in proportioning can be only approximate and is dependent upon the skill and care of the operator. Although this cropping technique may be relatively inaccurate and time-consuming, it is possible to obtain any size and proportion of selected area.

Conventionally, the accuracy of proportioning the selected area of a print or the like is made possible by providing a positive control. Two masks each have an aperture with sides and ends of the desired proportion. The print to be cropped is placed in the aperture of one mask and the overlapping mask is guided on tracks along a line joining the apices of opposite angles of the two masks. A fixed ratio of side to end of the selected area of the print is maintained. Although this cropper provides a quick and accurate means for selecting and proportioning an area of a print, it is possible to select only one proportion.

A patent illustrating the prior art as described is:

Variable Photographic Mask for Maintaining Constant Proportions of a Visible Area , U.S. Pat. No. 2,246,920.

My present invention improves upon the positive controlled cropper by providing two or more possible proportions while retaining the positive control necessary to accuracy and efficiency of measurement. Two masks have apertures each of which have two sides forming one corner proportioned differently from the other two sides forming the diagonally opposite corner. The masks are overlapping with like-proportioned corners oppositely located. One mask is a slide positioned within a sheath with two open ends, the sheath forming the other mask. The slide is positively controlled to move in the sheath and in the direction of a line joining the opposing corners. By moving the slide to adjust the relative position of two like-proportioned corners, one of the slide and one of the sheath, the size of the selected print area may be determined according to one predetermined proportion. Another proportion for the same selected print area may be chosen by moving the slide to adjust the relative position of the other two like-proportioned corners of the slide and sheath.

SUMMARY OF THE INVENTION

Briefly, an apertured unit is provided for demarcating a selected portion of a photograph or the like. The unit comprises a sheath having two opposite open ends and a centerline intersecting the open ends. A slide is located within the sheath and is of a size and shape complementary to that of the sheath. A centerline of the slide is coincident to the sheath centerline. The slide is adapted to move within the sheath while maintaining coincident centerlines. The sheath and slide have an aperture therethrough with two diagonally opposite corners located on the centerlines. Two aperture sides from one corner, those sides being of different length ratio than the two aperture sides forming the other corner. The slide aperture is rotated through 180 degrees upon the sheath centerline for location within the sheath.

BRIEF DESCRIPTION OF THE DRAWINGS

The FIGURE illustrates a mask with apertures in three positions to demonstrate two different proportions of a selected area of a photograph.

DESCRIPTION OF THE PREFERRED EMBODIMENTS

Referring now to the drawing, the FIGURE illustrates an apertured unit or mask 10 comprising a sheath 11 and a slide 12. The sheath 11 has a top card, visible in the drawing, and a bottom card, not visible in the drawing and hidden below the top card. The two cards are riveted at points 13 along the margins of the cards. The cards can be secured in any conventional manner or formed of one piece with a space between the pieces. Sheath 11 has two opposite open ends 15, 16 between the cards. Slide 12 is located within sheath 11 in the space between the cards and extends through ends 15, 16. The sides of slide 12 ride adjacent to rivets 13 thus being guided as the slide moves. A centerline 17 divides sheath 11 midway between the sides of the sheath. Centerline 17 also defines the midway division between the sides of the slide. An aperture 18 extends through both cards of sheath 11. Aperture 18 comprises sides 20, 21, 22, 23, connecting edge 24 and corners 26, 27. Corners 26, 27 are located diagonally opposite each other on centerline 17. Corner 26 is formed by sides 20, 21 and corner 27 is formed by sides 22, 23. Sides 20, 21 together define one proportion or ratio, i.e., the length of each side may be in the ratio of 8:10, a standard enlargement proportion of 8 × 10 inches. Sides 22, 23 together define another proportion or ratio, e.g., the lengths may be in a ratio of 5:7. In construction of aperture 18 the sides 20, 21, 22, 23 are given appropriate lengths and the corners 26, 27 brought toward each other along centerline 17 until sides 20, 22 intersect to form another corner 30. The sides 21, 23 will not intersect and connecting edge 24 simply forms another side to complete the aperture. The ratio of lengths of the sides forming corner 26 may be of any ratio as may the ratio of lengths of the sides forming corner 27. Aperture 31 is of identical size and shape as aperture 18. It is constructed by centering slide 12 in sheath 11 and punching the aperture through both cards of sheath 11 and slide 12. Slide 12 is repositioned in sheath 11 by rotating it 180°. Thus, each of the sides 20, 21, 22, 23, 24 and corners 26, 27, 30 of aperture 18 will be located directly opposite the corresponding sides 20', 21', 22', 23', 24' and corners 26', 27', 30' of aperture 31 and slide 12 is centered in sheath 11. The identical but repositioned sides and corners of aperture 31 have been given the same number with a prime notation for the corresponding sides and corners of aperture 18 in order to emphasize the relationship.

In operation, mask 10 is placed upon the print or the like to be cropped. The mask is positioned so the selected area is visible through aperture 18. While maintaining the print (not shown) and mask 10 in place, slide 12 is shifted to the right or left along centerline 17. The direction of shift is determined by the desired proportion. In the drawing aperture 31 is repositioned to the right. The new position of slide 12 is illustrated in "o's" to distinguish positions more clearly. The aperture through sheath 11 and slide 12 has been reduced in size, being bordered by sides 20, 21 in solid line and sides 20', 21' in "o's". The sides 20, 21 are of the same proportion as sides 20', 21'. When the selected area of the print is exposed through the smaller aperture, then the print is marked along the sides of the aperture. The marking of the print will be according to the ratio of lengths of sides, 20, 21, e.g., 8 × 10 inches.

A different proportion is possible with the same mask 10 by following the same cropping procedure as described, but instead moving slide 12 to the left along centerline 17. The left-shifted position of slide 12 is illustrated in "x's" to distinguish that position. The aperture through sheath 11 and slide 12 has been reduced in size, being bordered by sides 22, 23 in solid line and sides 22', 23' in "x's". The sides 22, 23 are of the same proportion as sides 22', 23' and of different proportion than sides 20, 21. Again, when the selected area of the print is exposed through this smaller aperture, then the print is marked along the sides of this aperture. The marking of the print will be according to the ratio of lengths of sides 22, 23, e.g., 5 × 7 inches.

It is apparent that any size of aperture may be constructed according to the requirements of the cropping. With mask 10 two predetermined proportions may be employed, but it is also obvious that similar apertures as that described with different proportions may be constructed on the same mask to obtain many proportions with a single unit. For convenience mask 10 may be marked with a scale as illustrated to aid other aspects of photographic cropping. The materials of mask 10 should be durable and should be relatively firm. Cardboard, plastics, metals and the like are suitable. Many other modifications of the embodiment described are obvious in light of the description. This invention is not limited to the embodiment as described but encompasses those modifications which would be obvious to make and which fall within the claims.

I claim:

1. An apertured unit for demarcating a selected portion of a photograph or the like, which comprises:
    a sheath having two opposite open ends and a centerline intersecting the open ends; and
    a slide located within the sheath and of a size and shape complementary to that of the sheath, said slide having a centerline coincident to the sheath centerline and adapted to slide within the sheath while maintaining coincident centerlines,
    said sheath and slide having an aperture therethrough with two diagonally opposite corners located on the centerlines, two aperture sides forming one corner being of a different ratio of length than the two aperture sides forming the other corner, the slide aperture so defined being rotated through 180 degrees upon the sheath centerline for location within the sheath.

2. An apertured unit as recited in claim 1 wherein the sheath and slide are of a plastic material.

* * * * *